US011282901B2

(12) United States Patent
Kim et al.

(10) Patent No.: US 11,282,901 B2
(45) Date of Patent: Mar. 22, 2022

(54) SENSOR INCLUDING CONTROL LAYERS, AND DISPLAY DEVICE INCLUDING THE SAME

(71) Applicant: Samsung Display Co., Ltd., Yongin-si (KR)

(72) Inventors: Sikwang Kim, Daegu (KR); Minsuk Ko, Cheonan-si (KR); Kabjong Seo, Hwaseong-si (KR); Yong-Hoon Yang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/894,548

(22) Filed: Jun. 5, 2020

(65) Prior Publication Data
US 2021/0020708 A1   Jan. 21, 2021

(30) Foreign Application Priority Data

Jul. 17, 2019   (KR) ........................ 10-2019-0086482

(51) Int. Cl.
*H01L 27/32*      (2006.01)
*G06K 9/00*       (2006.01)
*G06F 21/32*      (2013.01)
*H01L 51/52*      (2006.01)

(52) U.S. Cl.
CPC .......... *H01L 27/3225* (2013.01); *G06F 21/32* (2013.01); *G06K 9/00013* (2013.01); *H01L 51/5253* (2013.01)

(58) Field of Classification Search
None
See application file for complete search history.

(56) References Cited

U.S. PATENT DOCUMENTS

| 10,268,884 | B2 | 4/2019 | Jones et al. |
| 10,360,431 | B2 | 7/2019 | Gozzini et al. |
| 2015/0177884 | A1* | 6/2015 | Han ................... G06F 3/04166 345/174 |
| 2017/0220844 | A1* | 8/2017 | Jones ................... G06F 3/0421 |
| 2018/0233531 | A1* | 8/2018 | Huang ............. H01L 27/14678 |
| 2018/0293452 | A1* | 10/2018 | Chung ................ G06K 9/0004 |
| 2018/0373945 | A1* | 12/2018 | Wu ..................... G02B 27/0988 |

FOREIGN PATENT DOCUMENTS

| CN | 110088768 A | * | 8/2019 | .......... G06K 9/0004 |
| KR | 10-0911460 B1 | | 8/2009 | |
| KR | 10-2017-0109651 A | | 9/2017 | |
| KR | 10-2018-0100140 A | | 9/2018 | |

* cited by examiner

*Primary Examiner* — Kirk W Hermann
(74) *Attorney, Agent, or Firm* — Lewis Roca Rothgerber Christie LLP

(57) ABSTRACT

A display device includes a display panel, a control part below the display panel and including a first control layer below the display panel, a second control layer below the first control layer, and a third control layer below the second control layer. The first control layer includes a first transmission portion and a first absorption portion. The second control layer includes a second transmission portion and a second absorption portion. The third control layer includes a third transmission portion and a third absorption portion. The display panel also includes a sensing layer below the control part to recognize biometric information.

17 Claims, 13 Drawing Sheets

SENSOR INCLUDING CONTROL LAYERS, AND DISPLAY DEVICE INCLUDING THE SAME

CROSS-REFERENCE TO RELATED APPLICATION

This application claims priority to and the benefit of Korean Patent Application No. 10-2019-0086482 filed on Jul. 17, 2019 in the Korean Intellectual Property Office, the entire contents of which are incorporated herein by reference.

BACKGROUND

1. Field

Embodiments of the present disclosure relate to fingerprint sensors and display devices.

2. Related Art

Display devices provide various functions that enable the user to interact with the display device. For example, the display device may display an image to provide information to the user or may detect the user's input. Recent display devices also have the function of detecting the user's fingerprints. Methods for identifying fingerprints include a capacitive type method based on a variation in capacitance between electrodes, an optical type method using an optical sensor to detect incident light, or an ultrasonic type method utilizing a piezoelectric material to detect vibration. For recent display devices, a sensor for detecting fingerprints may be assembled at a rear surface of a display panel.

SUMMARY

Some example embodiments of the present disclosure provide a sensor having improved fingerprint recognition and a display device including the same.

According to some example embodiments of the present disclosure, a display device may include: a display panel; a control part below the display panel and including a first control layer below the display panel, a second control layer below the first control layer, and a third control layer below the second control layer, the first control layer including a first transmission portion and a first absorption portion, the second control layer including a second transmission portion and a second absorption portion, and the third control layer including a third transmission portion and a third absorption portion; and a sensing layer below the control part to recognize biometric information.

In some embodiments, when viewed on a plane, a portion of the first transmission portion may overlap the second transmission portion, and another portion of the first transmission portion may overlap the second absorption portion.

In some embodiments, when viewed on a plane, a portion of the second transmission portion may overlap the third transmission portion, and another portion of the second transmission portion may overlap the third absorption portion.

In some embodiments, thicknesses of the first, second, and third control layers may be the same as each other.

In some embodiments, at least one of a first thickness of the first control layer, a second thickness of the second control layer, and a third thickness of the third control layer may be different from the thicknesses of the other control layers.

In some embodiments, the second thickness may be greater than the first thickness and the third thickness.

In some embodiments, when viewed on a plane, a first area of the first transmission portion, a second area of the second transmission portion, and a third area of the third transmission portion may be substantially the same.

In some embodiments, when viewed on a plane, a first overlapping area of a region where the first and second transmission portions overlap each other may be substantially the same as a second overlapping area of a region where the first, second, and third transmission portions all overlap each other.

In some embodiments, when viewed on a plane, a first overlapping area of a region where the first and second transmission portions overlap each other may be greater than a second overlapping area of a region where the first, second, and third transmission portions all overlap each other.

In some embodiments, when viewed on a plane, a maximum width of the first transmission portion may be greater than a maximum width of a region where the first and second transmission portions overlap each other.

In some embodiments, the display panel may include an active region which displays an image. Each of the sensing layer and the control part may overlap an entirety of the active region.

In some embodiments, the display device may further include a protection layer on the first control layer. The protection layer may be between the display panel and the first control layer.

In some embodiments, the display panel may include a circuit layer directly on the protection layer, an emission layer on the circuit layer, and an encapsulation layer on the emission layer.

In some embodiments, the display panel may include a base layer, a circuit layer on the base layer, an emission layer on the circuit layer, and an encapsulation layer on the emission layer. The control part may be attached to the base layer.

According to some example embodiments of the present disclosure, a sensor may include: a sensing layer to recognize biometric information; and a control part on the sensing layer and including at least three control layers. Each of the control layers may include a plurality of transmission portions and an absorption portion which surrounds the transmission portions.

In some embodiments, the control part may include a first control layer, a second control layer between the first control layer and the sensing layer, a third control layer between the second control layer and the sensing layer. The first control layer may include a first transmission portion and a first absorption portion. The second control layer may include a second transmission portion and a second absorption portion. The third control layer may include a third transmission portion and a third absorption portion.

In some embodiments, the first transmission portion may overlap the second transmission portion and the second absorption portion. The second transmission portion may overlap the third transmission portion and the third absorption portion.

In some embodiments, an overlapping area of a region where the first, second, and third transmission portions all overlap each other may be less than an area of each of the first, second, and third transmission portions.

In some embodiments, a maximum width of the overlapping area may be less than a maximum width of each of the first, second, and third transmission portions.

In some embodiments, when viewed on a plane, a first area of the first transmission portion, a second area of the second transmission portion, and a third area of the third transmission portion may be substantially the same.

BRIEF DESCRIPTION OF THE DRAWINGS

The accompanying drawings, together with the specification, illustrate some embodiments of the subject matter of the present disclosure, and, together with the description, serve to explain principles of some embodiments of the subject matter of the present disclosure.

DETAILED DESCRIPTION

Figure 1:
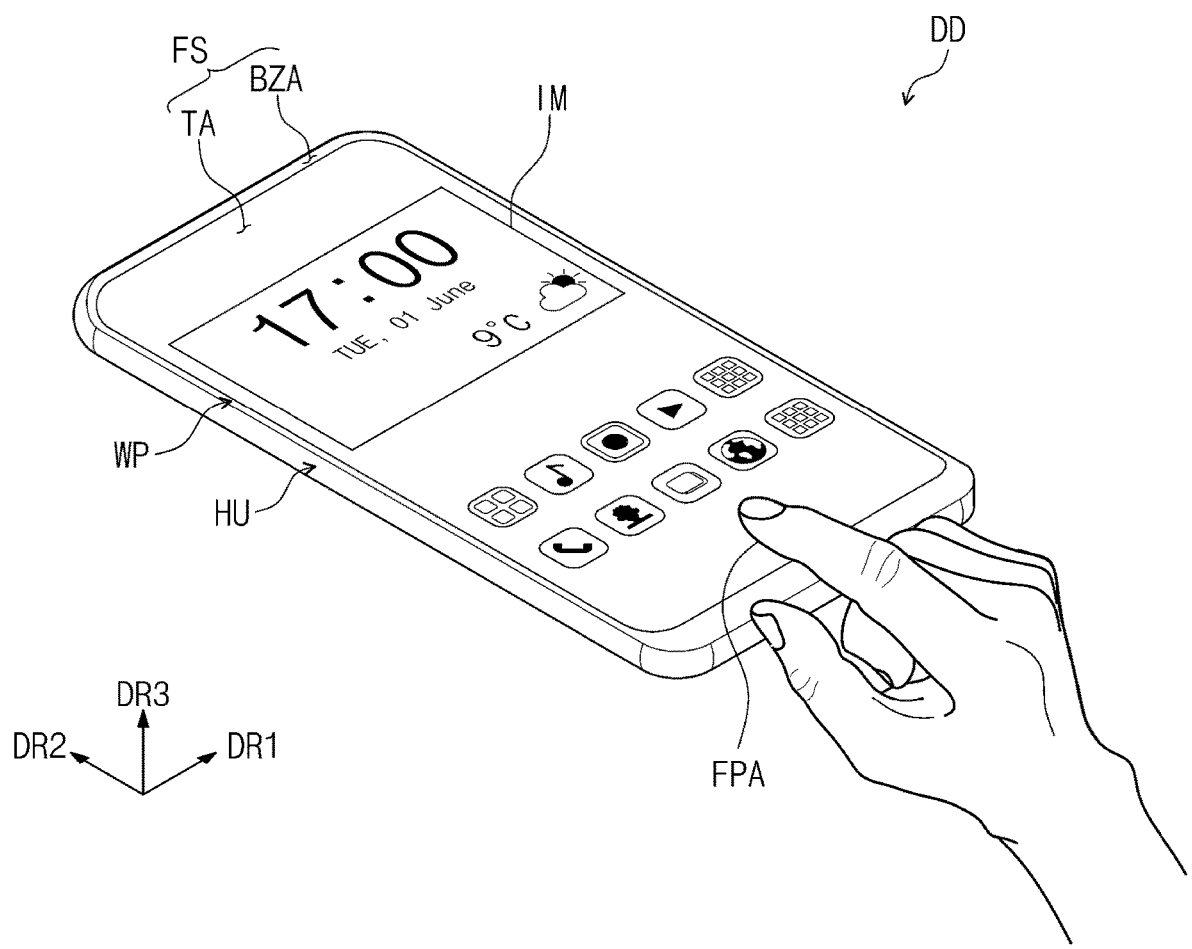
FIG. 1 illustrates a perspective view showing a display device according to some example embodiments of the present disclosure.

In this description, when a first element (e.g., component, region, layer, portion, etc.) is referred to as being "on", "connected to", or "coupled to" a second element, the first element may be directly on, directly connected to, or directly coupled to the second element, or at least one intervening element may be interposed therebetween.

Like reference numerals indicate like components. Moreover, in the drawings, thicknesses, ratios, and dimensions of components may be exaggerated for effectively explaining the technical contents.

The term "and/or" includes any and all combinations of one or more of the associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the present disclosure. Unless the context clearly indicates otherwise, the singular forms are intended to include the plural forms as well.

In addition, the terms "beneath", "lower", "above", "upper", and the like are used herein to describe one component's relationship to other component(s), as illustrated in the drawings. The relative terms are intended to encompass different orientations in addition to the orientations illustrated in the drawings.

Unless otherwise defined herein, all terms used herein, including technical and scientific terms, have the same meaning generally understood by one of ordinary skilled in the art. Also, terms, such as those defined in dictionaries generally used, should be interpreted as having a meaning that is consistent with their meaning in the context of the relevant art and/or the present specification, and should not be interpreted in an idealized or overly formal sense, unless expressly so defined herein.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

Some example embodiments of the present disclosure will now be described in conjunction with the accompanying drawings.

Figure 2:
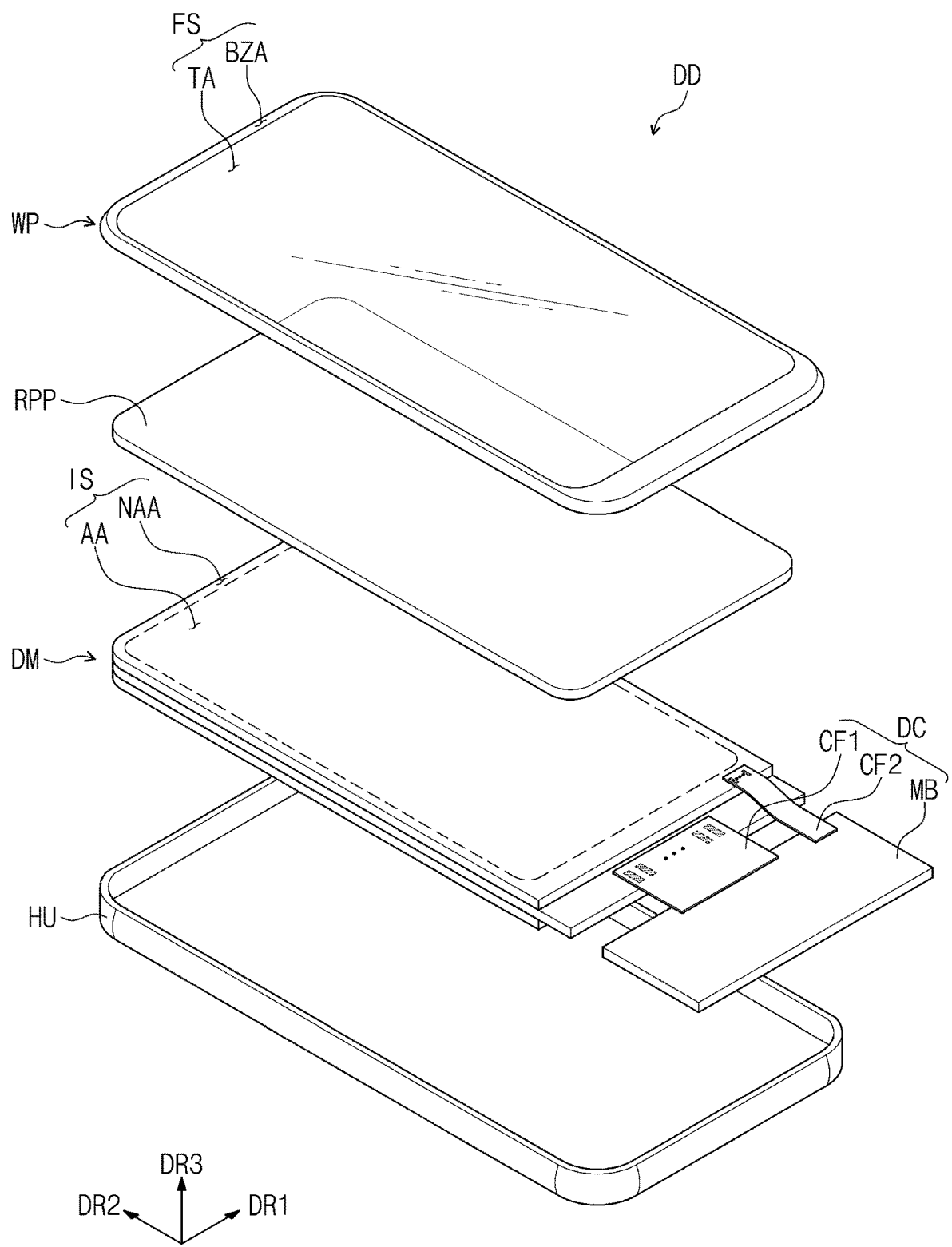
FIG. 2 illustrates an exploded perspective view showing a display device according to some example embodiments of the present disclosure.

FIG. 1 illustrates a perspective view showing a display device according to some example embodiments of the present disclosure. FIG. 2 illustrates an exploded perspective view showing a display device according to some example embodiments of the present disclosure.

Referring to FIGS. 1 and 2, a display device DD may be an apparatus that is activated by electric signals. The display device DD may include various examples (e.g., may be used for various suitable devices). For example, the display device DD may be used for large-sized electronic apparatuses, such as, for example, televisions, monitors, or outdoor billboards, and may also be used for small- and medium-sized electronic apparatuses, such as, for example, personal computers, laptop computers, personal digital terminals, automobile navigation units, game consoles, portable electronic devices, or cameras. However, the display device DD is not limited thereto, and the display device DD may be used for any suitable electronic apparatus that is consistent with the scope and spirit of the present disclosure. In FIGS. 1 and 2, a smart-phone is illustrated as an example of the display device DD.

The display device DD may display an image IM (e.g., may display an image IM in a third direction DR3) on a display surface FS parallel (e.g., substantially parallel) to a plane defined by a first direction DR1 and a second direction DR2. The image IM may include not only dynamic images but also static images. FIG. 1 shows a clock window and icons as an example of the image IM. The display surface FS, on which the image IM is displayed, may correspond to a front surface (e.g., a top surface) of the display device DD and also to a front surface (e.g., a top surface) of a window WP.

In some embodiments, front and rear surfaces (e.g., top and bottom surfaces) of each component are defined based on a direction along which the image IM is displayed. For example, the relative orientation of the front and rear surfaces of each component may be defined based on the third direction DR3. The front and rear surfaces may be opposite to each other in the third direction DR3, and a normal direction to each of the front and rear surfaces may be parallel (e.g., substantially parallel) to the third direction DR3. Directions indicated by the first, second, and third directions DR1, DR2, and DR3 are relative concepts and may be changed into other directions. In this description, the phrase "when viewed on a plane" may mean "when viewed in the third direction DR3" (e.g., "when viewed as a cross-section along the third direction DR3").

The display device DD, according to some embodiments, may detect a user's input that is externally applied. The user's input may include at least a portion of a user's body, light, heat, pressure, and/or any suitable type of input. In some embodiments, depending on a structure of the display device DD, the display device DD may detect a user's input that is applied to a lateral or rear surface of the display device DD, but embodiments of the present disclosure are not limited thereto.

The display device DD may detect a user's fingerprint FPA that is externally applied. The display surface FS of the display device DD may include a fingerprint detection region. The fingerprint detection region may be on all or a portion of a transmission region TA.

The display device DD may include a window WP, an antireflection panel RPP, a display module DM, and a housing HU. In some embodiments, the window WP and the housing HU may be combined with (e.g., may be connected to or attached to) each other to constitute (e.g., to provide) an appearance of the display device DD.

The window WP may include an optically transparent dielectric material. For example, the window WP may include glass and/or plastic. The window WP may have a single-layered structure or a multi-layered structure. For example, the window WP may include either a plurality of plastic films that are coupled together through an adhesive, or a glass substrate and a plastic film that are coupled together through an adhesive.

As discussed above, the front surface of the window WP may be used to define the relative orientation of the front surface of the display device DD. The transmission region TA may be an optically transparent area. For example, the transmission region TA may be an area having a visible light transmittance equal to or greater than about 90%.

A bezel region BZA may be an area where transmittance is relatively less than that of the transmission region TA. The bezel region BZA may define a shape of the transmission region TA. The bezel region BZA may be adjacent to, and may surround, the transmission region TA.

The bezel region BZA may have a set or certain color. The bezel region BZA may cover a peripheral region NAA of the display module DM and may prevent or reduce the peripheral region NAA from being externally recognized (e.g., from being visible from outside the display device DD). However, embodiments are not limited thereto, and, in some embodiments, the bezel region BZA may be omitted from the window WP.

The antireflection panel RPP may be below the window WP. The antireflection panel RPP may reduce a reflectance of external light that is incident (e.g., incident onto the antireflection panel RPP) from an upper side of the window WP. In some embodiments, the antireflection panel RPP may be omitted or may be a component included in the display module DM.

The display module DM may display the image IM, may sense an external input, and may detect the user's fingerprint FPA. The display module DM has a front surface IS that includes an active region AA and a peripheral region NAA. The active region AA may be an area that is activated by electric signals.

In some embodiments, the active region AA may be an area that displays the image IM and also detects an external input. The transmission region TA overlaps at least a part of the active region AA. For example, the transmission region TA entirely or at least partially overlaps the active region AA. Accordingly, a user may recognize the image IM through the transmission region TA or may provide an external input through the transmission region TA. However, embodiments are not limited thereto. The active region AA may be configured such that an area to display the image IM is separated from an area to detect an external input, but embodiments of the present disclosure are not limited thereto.

The peripheral region NAA may be an area covered with (e.g., covered by) the bezel region BZA. The peripheral region NAA is adjacent to the active region AA. The peripheral region NAA may surround the active region AA. The peripheral region NAA may include driving lines or driving circuits to drive the active region AA.

A driving circuit DC is electrically connected to the display module DM. The driving circuit DC includes a main circuit board MB, a first circuit board CF1, and a second circuit board CF2.

The main circuit board MB may include power supply connectors or various driving circuits to drive the display module DM. The first and second circuit boards CF1 and CF2 may be coupled to the main circuit board MB and the display module DM. For example, the first and second circuit boards CF1 and CF2 may electrically couple the main circuit board MB to the display module DM. For example, one side of each of the first and second circuit boards CF1 and CF2 may be coupled to the main circuit board MB, and another side of each of the first and second circuit boards CF1 and CF2 may be coupled to the display module DM. In some embodiments, a single main circuit board MB may be used to easily control the display module DM. In some embodiments, a plurality of main circuit boards MB may be used to control the display module DM. Each of the first and second circuit boards CF1 and CF2 may be a flexible circuit film. A driving chip may be mounted on each of the first and second circuit boards CF1 and CF2. In some embodiments, the first and second circuit boards CF1 and CF2 may be omitted. In some embodiments, the display module DM may be directly connected to the main circuit board MB, and the driving chip may be directly mounted on the display module DM.

The housing HU is combined with (e.g., connected to or attached to) the window WP. The housing HU and the window WP may be combined with each other to provide an inner space. The display module DM may be in the inner space. The housing HU may include a material whose rigidity is relatively high. In some embodiments, the housing HU may include one material selected from among glass, plastic, and metal. In some embodiments, the housing HU may have a plurality of frames and/or a plurality of plates, wherein each frame or plate includes one material selected from among glass, plastic, and metal. The housing HU may stably protect, from external impact, components of the display device DD that are in the inner space.

In some embodiments, a battery module or the like may be between the display module DM and the housing HU to provide power required for an overall operation of the display device DD.

Figure 3A:
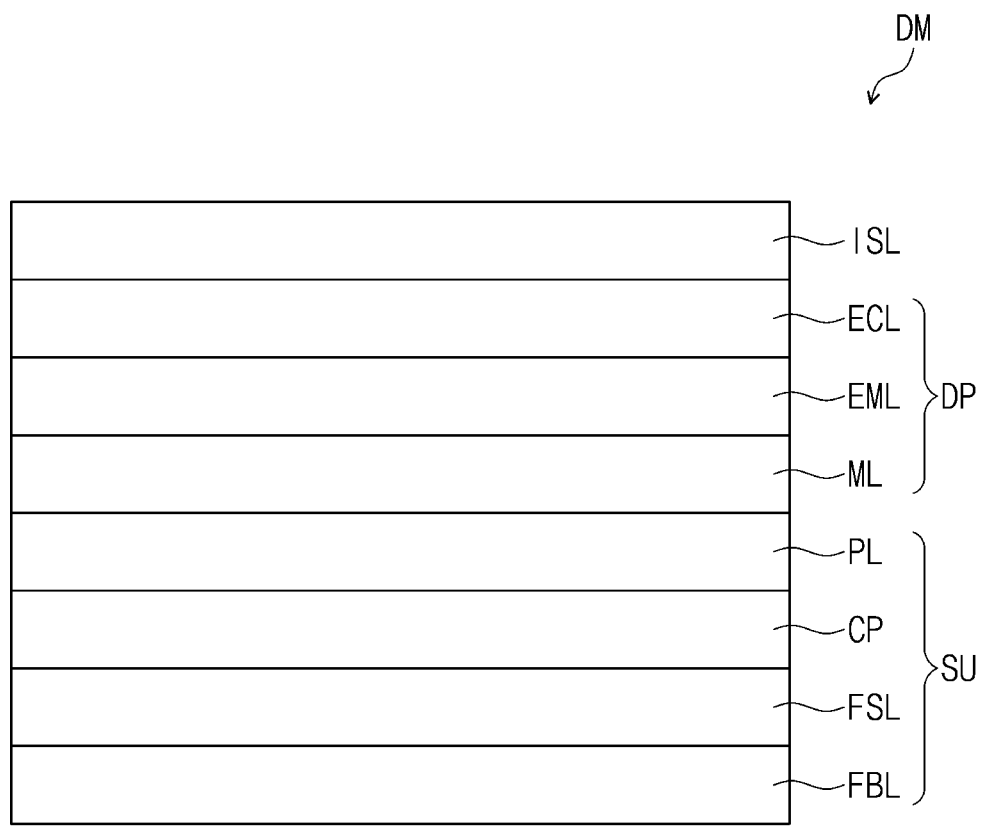
FIG. 3A illustrates a simplified cross-sectional view showing a stack structure of a display module according to some example embodiments of the present disclosure.
Figure 3A:
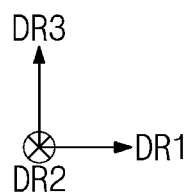

FIG. 3A illustrates a simplified cross-sectional view showing a stack structure of a display module according to some example embodiments of the present disclosure.

Referring to FIG. 3A, the display module DM may include an input sensing layer ISL, a display panel DP, and a sensor SU.

The sensor SU may be a layer that detects a user's fingerprint (see FPA of FIG. 1).

The sensor SU may include a base layer FBL, a sensing layer FSL, a control part CP, and a protection layer PL.

The base layer FBL may include a polyimide layer. However, embodiments are not limited thereto, and the base layer FBL may be a layer including any suitable material.

The sensing layer FSL may be on the base layer FBL. The sensing layer FSL may be a layer that recognizes biometric information. For example, the biometric information may be fingerprints. The sensing layer FSL may include a light-receiving element that receives incident light reflected from a user's fingerprint. The light-receiving element may be a photodiode.

The control part CP may be on the sensing layer FSL. The control part CP may control an incident angle of light incident onto the sensing layer FSL. In some embodiments, the control part CP may include at least three control layers, which will be discussed in more detail herein below.

The protection layer PL may be on the control part CP. The protection layer PL may include an inorganic metal. For example, the protection layer PL may be a silicon nitride layer. The protection layer PL may protect the control part CP. The protection layer PL may provide the sensor SU with a planar top surface.

The display panel DP may be on the sensor SU. The display panel DP may be a layer that provides (e.g., displays) an image. The active region (see AA of FIG. 2) of the display module DM may correspond to an active region of the display panel DP. In some embodiments, the sensor SU may overlap the entire active region (see AA of FIG. 2) of the display module DM. In some embodiments, the fingerprint detection region of the display surface (see FS of FIG. 1) may be on all of the transmission region (see TA of FIG. 1). However, embodiments are not limited thereto. In some embodiments, the sensor SU may overlap a portion of the active region (see AA of FIG. 2) of the display module DM.

The display panel DP may include a circuit layer ML, an emission layer EML, and an encapsulation layer ECL.

The circuit layer ML may be a layer that includes transistors, capacitors, and/or dielectric layers. In some embodiments, the circuit layer ML may be directly on the protection layer PL. In some embodiments, the circuit layer ML may be formed directly on the protection layer PL. In some embodiments, the sensor SU and the display panel DP may be formed through successive processes.

The emission layer EML may be on the circuit layer ML. The emission layer EML may be a layer that generates light. The emission layer EML may either generate light in response to electric signals or may control an amount of light (e.g., may control the amount of light that is generated). When the display panel DP is an organic light emitting display panel, the emission layer EML may include an organic light emitting material. When the display panel DP is a quantum dot light emitting display panel, the emission layer EML may include a quantum dot, a quantum rod, or the like.

The encapsulation layer ECL may be on the emission layer EML. The encapsulation layer ECL may include at least one dielectric layer. For example, the encapsulation layer ECL may include at least one inorganic layer and at least one organic layer. The inorganic layer may protect the emission layer EML against moisture and/or oxygen, and the organic layer may protect the emission layer EML against foreign substances such as, for example, dust particles.

The input sensing layer ISL may be on the display panel DP. The input sensing layer ISL may detect (e.g., may receive or may be utilized to detect) an external input to obtain information about position and/or intensity of the external input. The external input may include various examples. For example, the external input may include a user's body, light, heat, pressure, and/or any various suitable types of input. In some embodiments, the input sensing layer ISL may detect an input in contact with the window (see WP of FIG. 2) and/or an input that approaches or is close to (e.g., that is in proximity with) the window WP.

The input sensing layer ISL may be directly on the display panel DP. In some embodiments, the input sensing layer ISL and the display panel DP may be formed through successive processes. In some embodiments, the input sensing layer ISL may be attached to the display panel DP. In some embodiments, an adhesive layer may be between the input sensing layer ISL and the display panel DP. In some embodiments, the adhesive layer may be an optically transparent glue member. In some embodiments, the adhesive layer may include an ordinary adhesive or glue.

Figure 3B:
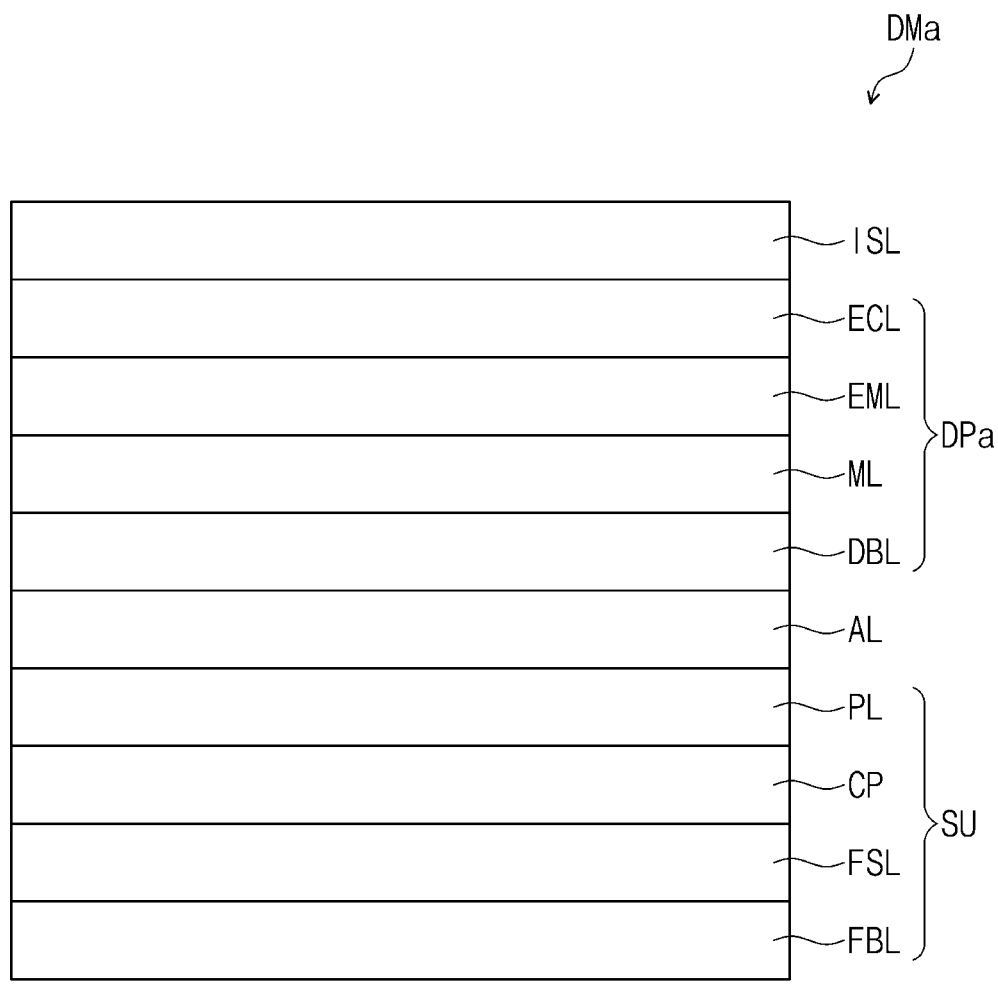
FIG. 3B illustrates a simplified cross-sectional view showing a stack structure of a display module according to some example embodiments of the present disclosure.

FIG. 3B illustrates a simplified cross-sectional view showing a stack structure of a display module according to some example embodiments of the present disclosure. In the description corresponding to FIG. 3B, different components from those of FIG. 3A are explained in some detail, the same components as those of FIG. 3A are allocated the same reference numbers, and redundant descriptions of the same components will not be repeated.

Referring to FIG. 3B, a display module DMa may include an input sensing layer ISL, a display panel DPa, and a sensor SU.

The display panel DPa may include a base layer DBL, a circuit layer ML, an emission layer EML, and an encapsulation layer ECL. The circuit layer ML may be on the base layer DBL.

The display panel DPa may be attached to the sensor SU. The display panel DPa and the sensor SU may be combined with (e.g., attached to) each other through (e.g., by) an adhesive layer AL. In some embodiments, the protection layer PL may be omitted from the sensor SU.

Figure 4:
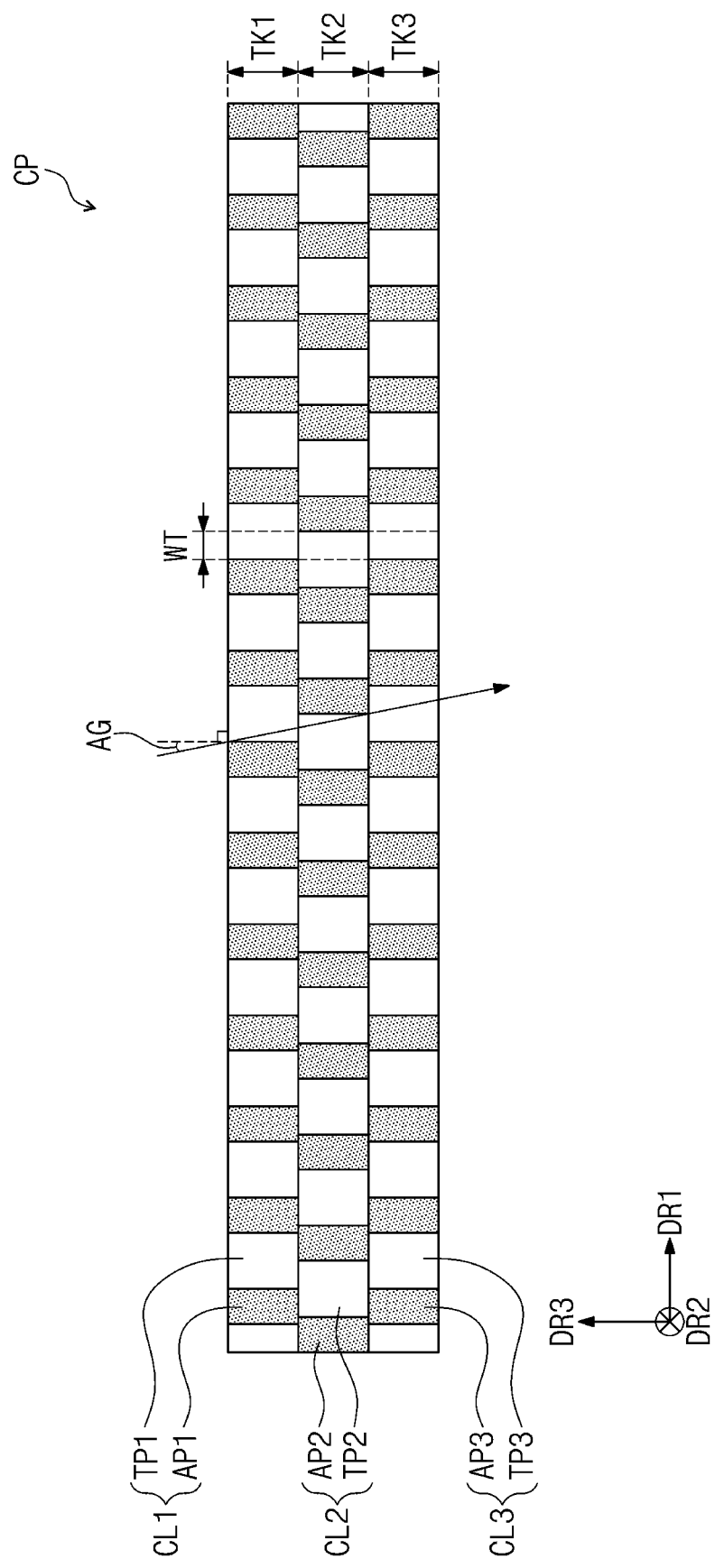
FIG. 4 illustrates a cross-sectional view showing a control part according to some example embodiments of the present disclosure.

FIG. 4 illustrates a cross-sectional view showing a control part according to some example embodiments of the present disclosure.

Referring to FIGS. 3A and 4, the control part CP may include at least three control layers. For example, the control part CP may include a first control layer CL1, a second control layer CL2, and a third control layer CL3. Each of the first, second, and third control layers CL1, CL2, and CL3 may be a collimator. The number of the control layers included in the control part CP, however, is not limited thereto. For example, in some embodiments, the control part CP may include four or more control layers.

The first control layer CL1 may be below the display panel DP. The first control layer CL1 may be between the display panel DP and the sensing layer FSL. The second control layer CL2 may be below the first control layer CL1 and may be between the first control layer CL1 and the sensing layer FSL. The third control layer CL3 may be below the second control layer CL2 and may be between the second control layer CL2 and the sensing layer FSL.

The first, second, and third control layers CL1, CL2, and CL3 may respectively have a first thickness TK1, a second thickness TK2, and a third thickness TK3, and the first, second, and third thicknesses TK1, TK2, and TK3 may be substantially the same. The phrase "substantially the same" may mean the same or within a range around the same to include process errors (e.g., to account for deviations that occur during the manufacturing process).

The first control layer CL1 may include a first transmission portion TP1 and a first absorption portion AP1. The second control layer CL2 may include a second transmission portion TP2 and a second absorption portion AP2. The third control layer CL3 may include a third transmission portion TP3 and a third absorption portion AP3. The first, second, and third transmission portions TP1, TP2, and TP3 may have optical transparency, and the first, second, and third absorption portions AP1, AP2, and AP3 may have light-absorption properties.

Each of the first, second, and third transmission portions TP1, TP2, and TP3 may be provided in plural (e.g., may constitute a plurality of transmission portions). For example, the plurality of transmission portions of the first, second, and third transmission portions TP1, TP2, and TP3 may be arranged along the first and second directions DR1 and DR2.

When viewed on a plane, a portion of the first transmission portion TP1 may overlap the second transmission portion TP2, and another portion of the first transmission portion TP1 may overlap the second absorption portion AP2. In some embodiments, a portion of the second transmission portion TP2 may overlap the third transmission portion TP3, and another portion of the second transmission portion TP2 may overlap the third absorption portion AP3. For example, the first transmission portion TP1 may be shifted (e.g., shifted along the first and/or second directions DR1 and DR2) relative to the second transmission portion TP2, and the second transmission portion TP2 may be shifted relative to the third transmission portion TP3.

The first, second, and third transmission portions TP1, TP2, and TP3 may have substantially the same area when viewed on a plane. The smaller the areas of the first, second, and third transmission portions TP1, TP2, and TP3, the smaller the incident angle AG of light that passes through the control part CP. For example, as the area of the first, second, and third transmission portions TP1, TP2, and TP3 decrease, the incident angle AG of light that passes through the control part CP decreases. The incident angle AG may indicate a maximum incident angle of light that is capable of passing through the control part CP. The smaller the incident angle AG, the less the probability of interference of light reflected from neighboring valleys of the fingerprint (see FPA of FIG. 1), which may result in an improvement in fingerprint recognition. For example, as the incident angle AG decreases, the probability that light reflected from neighboring valleys of the fingerprint FPA will interfere decreases. However, there may be process limits in reducing the areas of the first, second, and third transmission portions TP1, TP2, and TP3. According to some embodiments, it may be possible to decrease the incident angle AG without reducing the areas of the first, second, and third transmission portions TP1, TP2, and TP3 by adjusting the positional relationship between the first, second, and third transmission portions TP1, TP2, and TP3.

Table 1 below shows the incident angle AG measured in accordance with a width WT of a region where the first, second, and third transmission portions TP1, TP2, and TP3 overlap each other.

In Table 1, the incident angle AG is measured in accordance with the width WT when the control part CP has a thickness of 7.5 μm. The thickness may be a sum of the first thickness TK1, the second thickness TK2, and the third thickness TK3. It may be ascertained that the smaller the width WT, the smaller the incident angle AG. The incident angle AG may indicate a maximum incident angle on a plane parallel (e.g., substantially parallel) to a direction along which the width WT is measured (e.g., to a plane corresponding to the upper surface of the control part CP). When the width WT is 1 μm, the incident angle AG may be reduced to 7.6° (or more or less), which may result in an improvement in fingerprint recognition. When the control part CP includes a single control layer, there may be process limits in reducing the width of a transmission portion. When the control part CP includes only two control layers, light incident in one direction of the sensing layer (see FSL of FIG. 3A) may have a decreased incident angle, but light incident in a direction different from the one direction may have an increased incident angle (e.g., an incident angle that is larger than the incident angle of light incident in the one direction), which may result in a reduction in fingerprint recognition. In contrast, according to some embodiments of the present disclosure, the control part CP includes three or more control layers. In some embodiments, the positional relationship between transmission portions is adjusted such that transmission portions included in different control layers partially overlap each other and partially do not overlap. Therefore, the control part CP may easily control an incident angle of light incident onto the sensing layer FSL, and as a result, it may be possible to improve fingerprint recognition.

Figure 5:
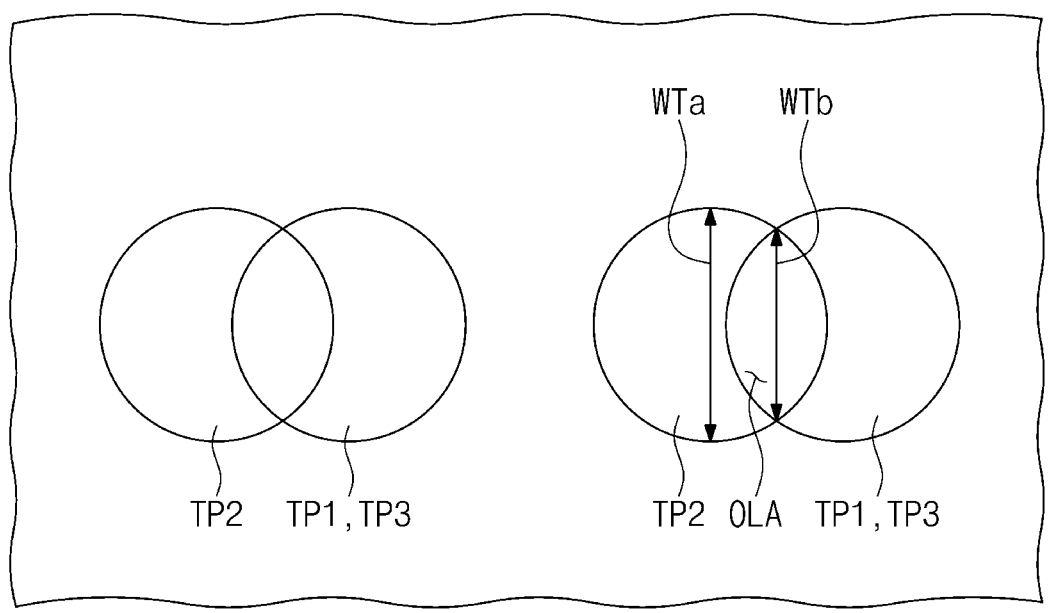
FIG. 5 illustrates an enlarged plan view partially showing a control part according to some example embodiments of the present disclosure.

FIG. 5 illustrates an enlarged plan view partially showing a control part according to some example embodiments of the present disclosure.

Referring to FIG. 5, there are illustrated two first transmission portions TP1, two second transmission portions TP2, and two third transmission portions TP3. The first transmission portion TP1 may completely overlap the third transmission portion TP3. However, the second transmission portion TP2 may be shifted in the first direction DR1 relative to the first transmission portion TP1 and the third transmission portion TP3.

An overlapping region OLA where the first and second transmission portions TP1 and TP2 overlap each other may be substantially the same as an overlapping region OLA where the first, second, and third transmission portions TP1, TP2, and TP3 all overlap each other.

Each of the first, second, and third transmission portions TP1, TP2, and TP3 may have a maximum width WTa greater than a maximum width WTb of the overlapping region OLA where the first, second, and third transmission portions TP1, TP2, and TP3 overlap each other.

Light reflected from fingerprints may be incident through the overlapping region OLA where the first, second, and third transmission portions TP1, TP2, and TP3 all overlap each other. According to some embodiments, the shift of the second transmission portion TP2 may cause the overlapping region OLA to have an area less than the area of each of the

TABLE 1

| Width (WT) [μm] | 2 | 1.9 | 1.8 | 1.7 | 1.6 | 1.5 | 1.4 | 1.3 | 1.2 | 1.05 | 1 |
|---|---|---|---|---|---|---|---|---|---|---|---|
| Incident Angle (AG) [°] | 15 | 14.2 | 13.5 | 12.8 | 12.0 | 11.3 | 10.6 | 9.8 | 9.1 | 8.0 | 7.6 | first, second, and third transmission portions TP1, TP2, and TP3. Therefore, an incident angle of light incident onto the sensing layer (see FSL of FIG. 3A) may be reduced to improve fingerprint recognition.

Figure 6:
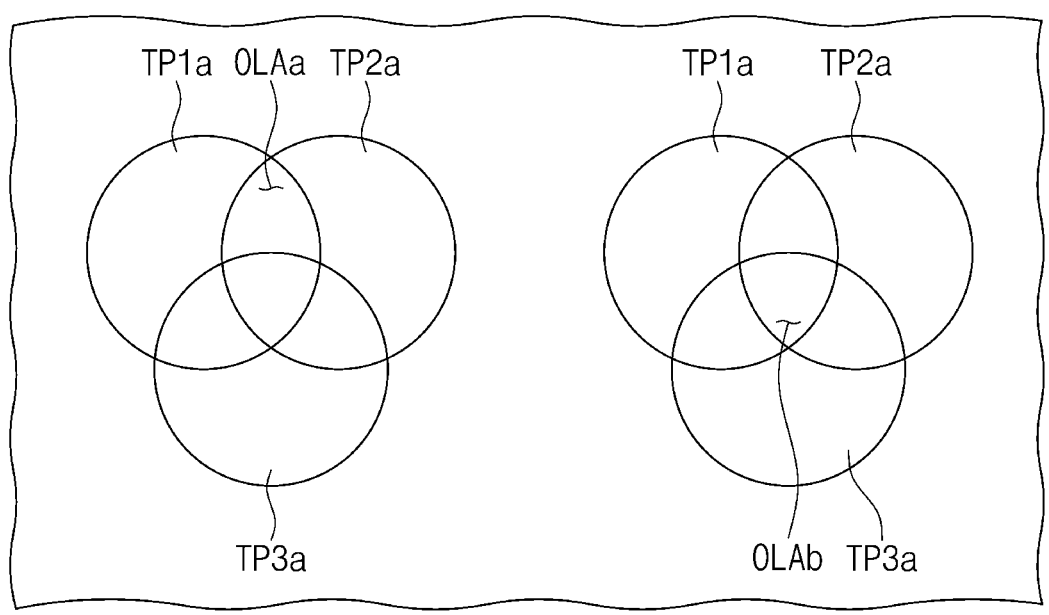
FIG. 6 illustrates an enlarged plan view partially showing a control part according to some example embodiments of the present disclosure.

FIG. 6 illustrates an enlarged plan view partially showing a control part according to some example embodiments of the present disclosure.

Referring to FIG. 6, there are illustrated two first transmission portions TP1a, two second transmission portions TP2a, and two third transmission portions TP3a.

The first transmission portion TP1a may be shifted relative to the second transmission portion TP2a and the third transmission portion TP3a, the second transmission portion TP2a may be shifted relative to the first transmission portion TP1a and the third transmission portion TP3a, and the third transmission portion TP3a may be shifted relative to the first transmission portion TP1a and the second transmission portion TP2a.

A first overlapping region OLAa where the first and second transmission portions TP1a and TP2a overlap each other may have an area greater than that of a second overlapping region OLAb where the first, second, and third transmission portions TP1a, TP2a, and TP3a all overlap each other.

According to some embodiments of FIG. 6, an incident angle of light incident through the second overlapping region OLAb may be reduced not only in the first direction DR1, but also in the second direction DR2. As a result, it may be possible to achieve an improvement in fingerprint recognition.

Figure 7:
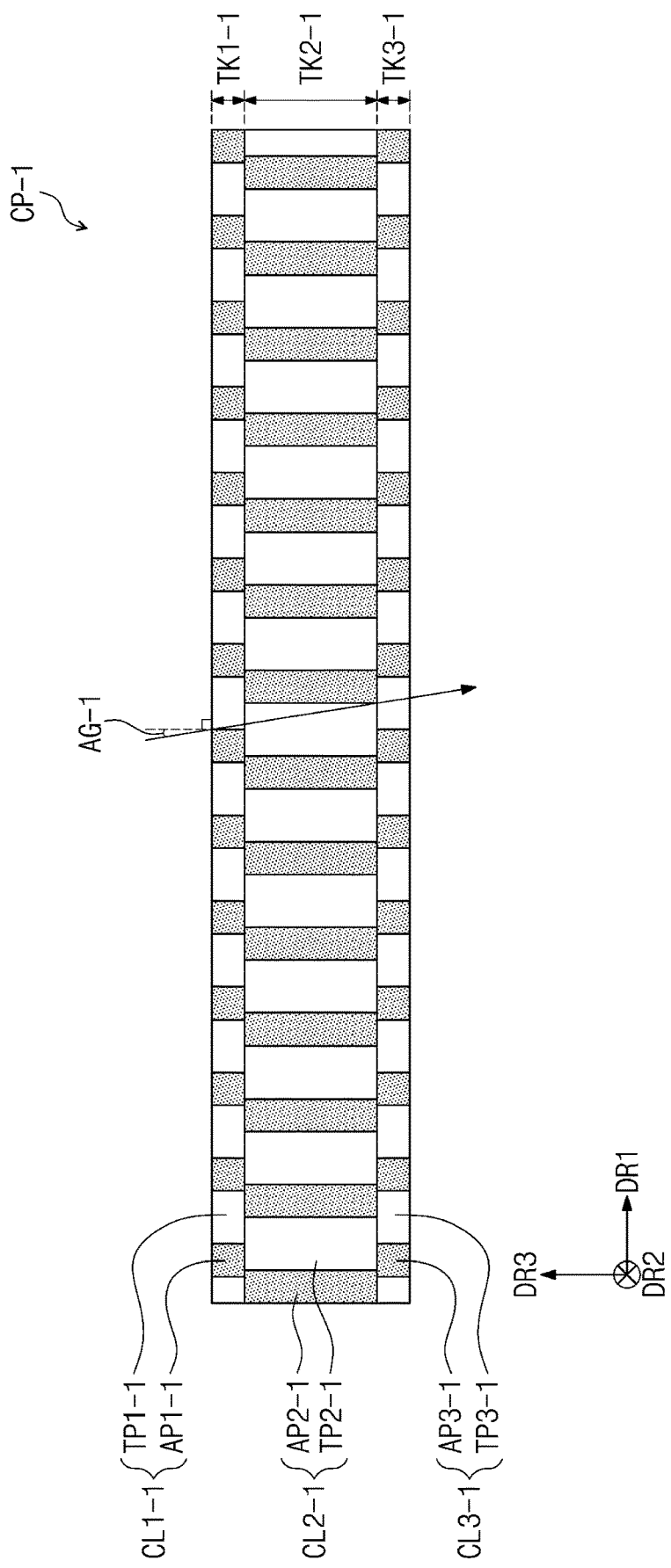
FIG. 7 illustrates a cross-sectional view showing a control part according to some example embodiments of the present disclosure.

FIG. 7 illustrates a cross-sectional view showing a control part according to some example embodiments of the present disclosure.

Referring to FIG. 7, a control part CP-1 may include a first control layer CL1-1, a second control layer CL2-1, and a third control layer CL3-1. The first control layer CL1-1 may include a first transmission portion TP1-1 and a first absorption portion AP1-1. The second control layer CL2-1 may include a second transmission portion TP2-1 and a second absorption portion AP2-1. The third control layer CL3-1 may include a third transmission portion TP3-1 and a third absorption portion AP3-1.

The first, second, and third control layers CL1-1, CL2-1, and CL3-1 may respectively have first, second, and third thicknesses TK1-1, TK2-1, and TK3-1, and at least one of the first, second, and third thicknesses TK1-1, TK2-1, and TK3-1 may be different from the other thicknesses. For example, the second thickness TK2-1 may be different from the first and third thicknesses TK1-1 and TK3-1. For example, the second thickness TK2-1 may be greater than the first and third thicknesses TK1-1 and TK3-1.

An incident angle AG-1 may be controlled by adjusting the second thickness TK2-1 of the second control layer CL2-1 that is at a middle portion of the control part CP-1 (e.g., that is between the first and third control layers CL1-1 and CL3-1 of the control part CP-1). For example, the larger the second thickness TK2-1 of the second control layer CL2-1, the smaller the incident angle AG-1. For example, as the second thickness TK2-1 increases, the incident angle AG-1 may decrease. The reduction in the incident angle AG-1 may improve fingerprint recognition.

FIGS. 8A to 8I illustrate cross-sectional views showing a method of forming a control part according to some example embodiments of the present disclosure.

Figure 8A:
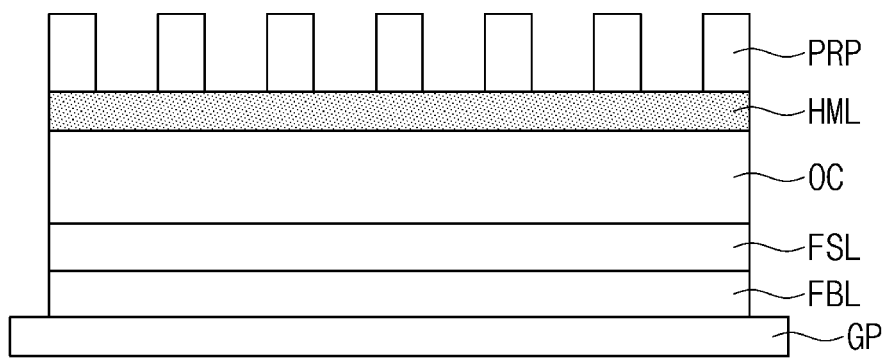
FIGS. 8A to 8I illustrate cross-sectional views showing a method of forming a control part according to some example embodiments of the present disclosure.

Referring to FIG. 8A, a carrier substrate GP is prepared. The carrier substrate GP may be a glass substrate.

A base layer FBL is formed on the carrier substrate GP. The base layer FBL may be formed by coating a polyimide solution on the carrier substrate GP and then curing the polyimide solution.

A sensing layer FSL is formed on the base layer FBL. The sensing layer FSL may include light-receiving elements such as, for example, photodiodes and may also include at least one dielectric layer. A plurality of mask processes may be utilized to form the sensing layer FSL.

A first layer OC is formed on the sensing layer FSL. The first layer OC may include an optically transparent organic material. The first layer OC may include a photosensitive material.

A mask layer HML is formed on the first layer OC. The mask layer HML may be referred to as (e.g., may be) a hardmask layer.

A photoresist layer including a photosensitive material is formed on the mask layer HML, and the photoresist layer is patterned to form a photoresist pattern PRP.

Figure 8B:
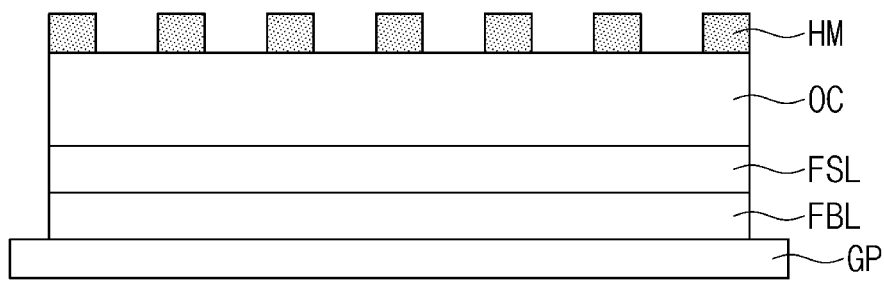

Referring to FIG. 8B, the photoresist pattern PRP is used to pattern the mask layer HML to form a first mask pattern HM.

Figure 8C:
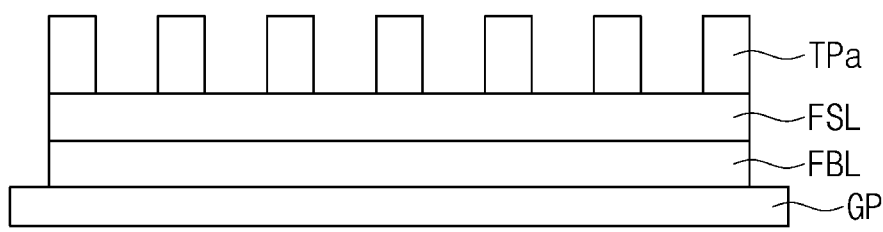

Referring to FIG. 8C, the first mask pattern HM is used to pattern the first layer OC to form a first transmission portion TPa. A dry etching process may be utilized to pattern the first layer OC. The first mask pattern HM may be removed.

Figure 8D:
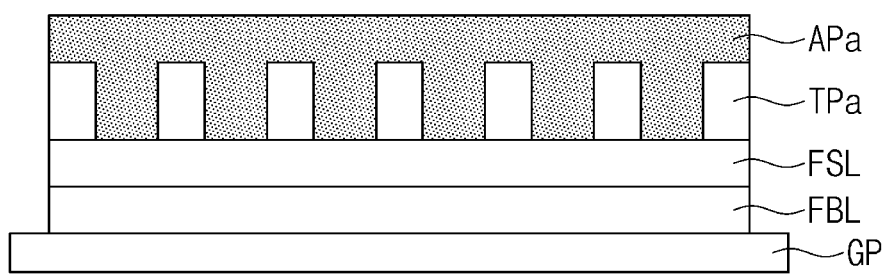

Referring to FIG. 8D, a first absorption layer APa is formed on the first transmission portion TPa. The first absorption layer APa may be a colored layer. For example, the first absorption layer APa may include a material in which light-absorbing particles are distributed. For example, the first absorption layer APa may be a layer in which a carbon-based pigment is mixed.

Figure 8E:
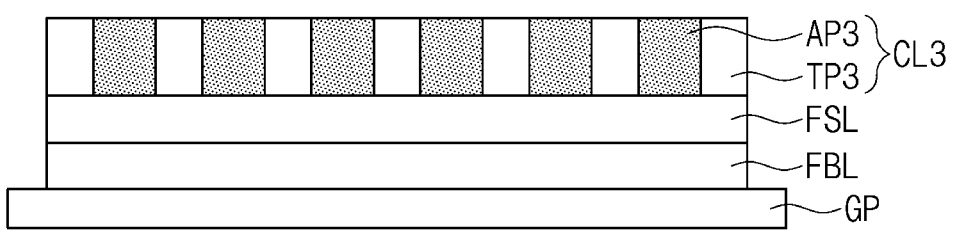

Referring to FIG. 8E, a planarization process is performed which polishes the first absorption layer APa and the first transmission portion TPa. A chemical mechanical polishing process may be utilized to planarize the first absorption layer APa and the first transmission portion TPa. The first absorption layer APa and the first transmission portion TPa may be planarized to form a third control layer CL3 that includes a third transmission portion TP3 and a third absorption portion AP3.

Figure 8F:
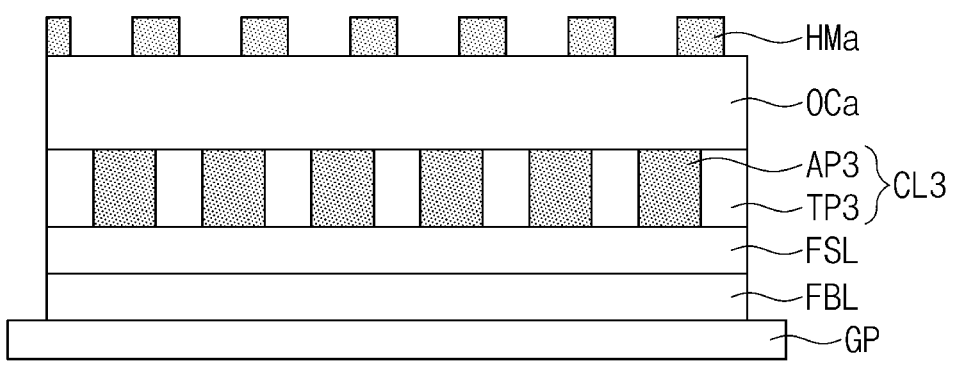

Referring to FIG. 8F, a second layer OCa is formed on the third control layer CL3, and a second mask pattern HMa is formed on the second layer OCa.

When viewed on a plane, the formation position of the second mask pattern HMa may be different from that of the first mask pattern HM. For example, when viewed on a plane, the second mask pattern HMa may be formed on a location that is shifted relative to the third transmission portion TP3. Therefore, a portion of the second mask pattern HMa may overlap the third transmission portion TP3, and another portion of the second mask pattern HMa may overlap the third absorption portion AP3.

Figure 8G:
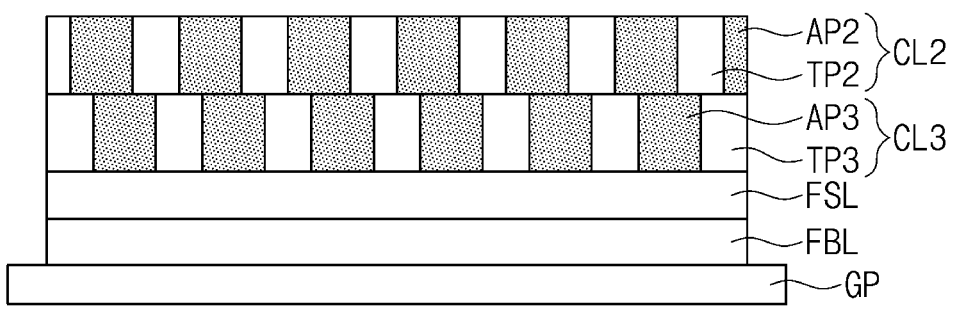

Referring to FIG. 8G, the second mask pattern HMa is used to pattern the second layer OCa. An absorption layer may be formed on the patterned second layer OCa, and then a planarization process may be performed to form a second control layer CL2 that includes a second transmission portion TP2 and a second absorption portion AP2.

Figure 8H:
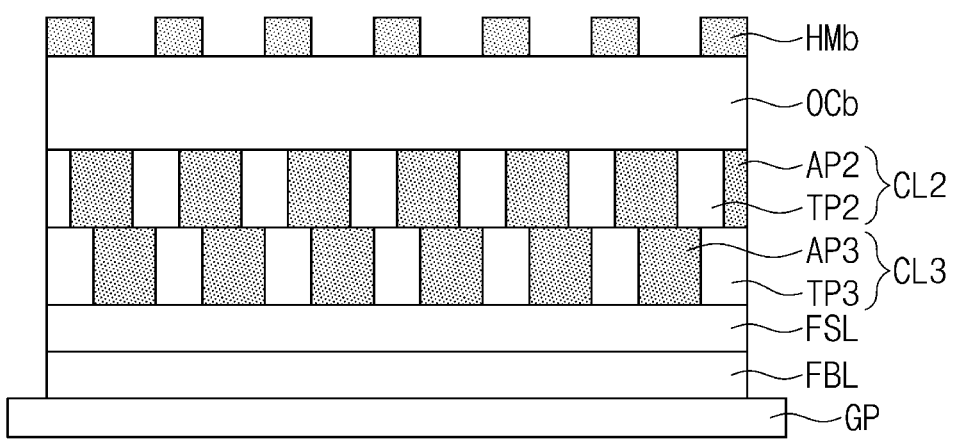

Referring to FIG. 8H, a third layer OCb is formed on the second control layer CL2, and a third mask pattern HMb is formed on the third layer OCb.

When viewed on a plane, the formation position of the third mask pattern HMb may be different from that of the second mask pattern HMa. For example, when viewed on a plane, the third mask pattern HMb may be formed on a location that is shifted relative to the second transmission portion TP2. Therefore, a portion of the third mask pattern HMb may overlap the second transmission portion TP2, and another portion of the third mask pattern HMb may overlap the second absorption portion AP2.

Figure 8I:
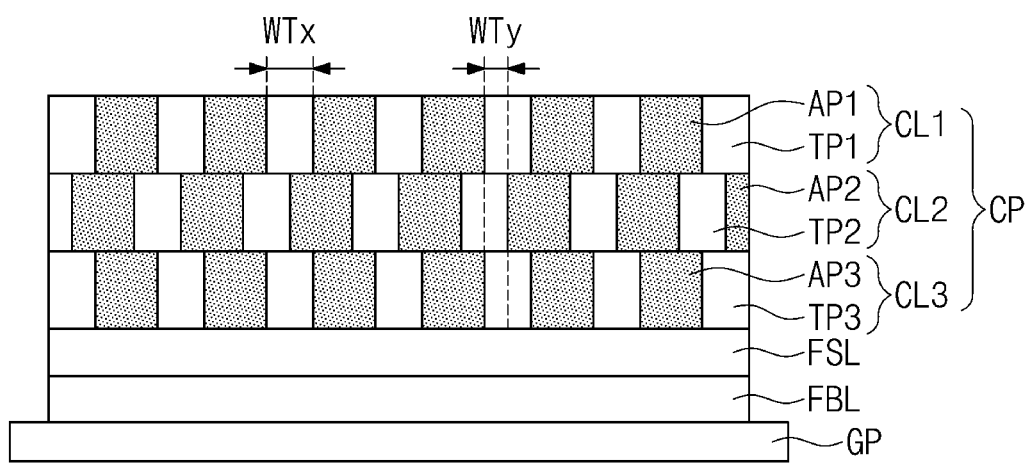

Referring to FIG. 8I, the third mask pattern HMb is used to pattern the third layer OCb. An absorption layer may be formed on the patterned third layer OCb, and then a planarization process may be performed to form a first control layer CL1 that includes a first transmission portion TP1 and a first absorption portion AP1. Therefore, a control part CP may be formed which includes the first, second, and third control layers CL1, CL2, and CL3.

Fingerprint recognition may be improved with a reduction in width of a transmission region capable of providing a pathway of light to the sensing layer FSL. However, when the control part CP includes a single layer, there may be process limits in reducing the width of the transmission region. According to some embodiments of the present disclosure, the control part CP may include first, second, and third control layers CL1, CL2, and CL3. The width of the transmission region in the control part CP may be controlled by adjusting an overlapping area of the first, second, and third transmission portions TP1, TP2, and TP3 included in the first, second, and third control layers CL1, CL2, and CL3. For example, even though each of the first, second, and third transmission portions TP1, TP2, and TP3 may have a width WTx of 2 μm, the adjustment of the overlapping area may cause the transmission region of the control part CP to have a width WTy of less than 2 μm.

When the first, second, and third transmission portions TP1, TP2, and TP3 are adjusted in their positions, the width WTy of the transmission region may be reduced beyond process limits. As a result, it may be possible to achieve an improvement in fingerprint recognition.

Light reflected from fingerprints may be incident onto the control part and travel through a region where first, second, and third transmission portions TP1, TP2, and TP3 all overlap each other. At least one of the first, second, and third transmission portions TP1, TP2, and TP3 may be shifted relative to the other transmission portions. Therefore, an area of the region where the first, second, and third transmission portions TP1, TP2, and TP3 all overlap each other may become smaller than the area of each of the first, second, and third transmission portions TP1, TP2, and TP3. As a result, an incident angle of light incident onto a sensing layer may be reduced to improve fingerprint recognition.

Although some embodiments have been described with reference to a number of illustrative examples thereof, it will be understood by those of ordinary skill in the art that various changes in form and details may be made without departing from the spirit and scope of the present disclosure as set forth in the following claims. Thus, the technical scope of the present disclosure is not limited by the embodiments and the examples described above, but by the appended claims, and equivalents thereof.

What is claimed is:

1. A display device, comprising:
a display panel;
a control part below the display panel and including a first control layer below the display panel, a second control layer below the first control layer, and a third control layer below the second control layer,
the first control layer including a first transmission portion and a first absorption portion,
the second control layer including a second transmission portion and a second absorption portion, and
the third control layer including a third transmission portion and a third absorption portion; and
a sensing layer below the control part to recognize biometric information,
wherein, in a plan view, an entire first overlapping area of an entire region where the first, second, and third transmission portions all overlap each other is less than an area of each of the first, second, and third transmission portions,
wherein at least one selected from a first thickness of the first control layer, a second thickness of the second control layer, and a third thickness of the third control layer is different from the thicknesses of the other layers,
wherein the first control layer, the second control layer, and the third control layer are arranged in a thickness direction, and the first thickness, the second thickness, and the third thickness are thicknesses in a direction parallel to the thickness direction, and
wherein the second thickness is greater than each of the first thickness and the third thickness.

2. The display device of claim 1, wherein, in the plan view, a portion of the first transmission portion overlaps the second transmission portion, and another portion of the first transmission portion overlaps the second absorption portion.

3. The display device of claim 1, wherein, in the plan view, a portion of the second transmission portion overlaps the third transmission portion, and another portion of the second transmission portion overlaps the third absorption portion.

4. The display device of claim 1, wherein, in the plan view, a first area of the first transmission portion, a second area of the second transmission portion, and a third area of the third transmission portion are substantially the same.

5. The display device of claim 1, wherein, in the plan view, a second overlapping area of a region where the first and second transmission portions overlap each other is substantially the same as the first overlapping area.

6. The display device of claim 1, wherein, in the plan view, a second overlapping area of a region where the first and second transmission portions overlap each other is greater than the first overlapping area.

7. The display device of claim 1, wherein, in the plan view, a maximum width of the first transmission portion is greater than a maximum width of a region where the first and second transmission portions overlap each other.

8. The display device of claim 1, wherein the display panel includes an active region to display an image,
wherein each of the sensing layer and the control part overlaps an entirety of the active region.

9. The display device of claim 1, further comprising a protection layer on the first control layer,
wherein the protection layer is between the display panel and the first control layer.

10. The display device of claim 9, wherein the display panel includes a circuit layer directly on the protection layer, an emission layer on the circuit layer, and an encapsulation layer on the emission layer.

11. The display device of claim 1, wherein the display panel includes a base layer, a circuit layer on the base layer, an emission layer on the circuit layer, and an encapsulation layer on the emission layer,
wherein the control part is attached to the base layer.

12. A sensor, comprising:
a sensing layer to recognize biometric information; and
a control part on the sensing layer and including at least three control layers, wherein each of the control layers includes a plurality of transmission portions and an absorption portion which surrounds the transmission portions, wherein, in a plan view, an entire first overlapping area of an entire region where the transmission portions of three control layers of the at least three control layers all overlap each other is less than an area of the transmission portions of each of the three control layers, and wherein a thickness of one control layer of the three control layers between the other two control layers of the three control layers is greater than each of thicknesses of the other two control layers.

13. The sensor of claim 12, wherein the control part includes a first control layer, a second control layer between the first control layer and the sensing layer, a third control layer between the second control layer and the sensing layer, wherein the first control layer includes a first transmission portion and a first absorption portion, the second control layer includes a second transmission portion and a second absorption portion, and the third control layer includes a third transmission portion and a third absorption portion.

14. The sensor of claim 13, wherein, the first transmission portion overlaps the second transmission portion and the second absorption portion, and the second transmission portion overlaps the third transmission portion and the third absorption portion.

15. The sensor of claim 13, wherein a second overlapping area of a region where the first, second, and third transmission portions all overlap each other is less than an area of each of the first, second, and third transmission portions.

16. The sensor of claim 15, wherein a maximum width of the second overlapping area is less than a maximum width of each of the first, second, and third transmission portions.

17. The sensor of claim 13, wherein, in the plan view, a first area of the first transmission portion, a second area of the second transmission portion, and a third area of the third transmission portion are substantially the same.

* * * * *